US011251546B2

(12) United States Patent
Cumant

(10) Patent No.: US 11,251,546 B2
(45) Date of Patent: Feb. 15, 2022

(54) DEVICE FOR FIXING AN ELECTRICAL CONNECTION TERMINAL TO A SUBSTRATE

(71) Applicant: DUBUIS ET CIE S.A.S., Villebarou (FR)

(72) Inventor: Mickael Cumant, Villebarou (FR)

(73) Assignee: DUBUIS ET CIE S.A S., Villebarou (FR)

( * ) Notice: Subject to any disclaimer, the term of this patent is extended or adjusted under 35 U.S.C. 154(b) by 0 days.

(21) Appl. No.: 16/678,363

(22) Filed: Nov. 8, 2019

(65) Prior Publication Data
US 2021/0143559 A1 May 13, 2021

Related U.S. Application Data

(63) Continuation of application No. PCT/EP2017/061222, filed on May 10, 2017.

(51) Int. Cl.
*H01R 4/34* (2006.01)
*H01R 43/20* (2006.01)

(52) U.S. Cl.
CPC ............. *H01R 4/34* (2013.01); *H01R 43/205* (2013.01)

(58) Field of Classification Search
CPC . H01R 4/34; H01R 4/06; H01R 11/12; H01R 43/205; H01R 4/64; H01R 2201/26; F16B 37/067
See application file for complete search history.

(56) References Cited

U.S. PATENT DOCUMENTS

| 4,046,054 A | 9/1977 | Gulistan | |
| 4,875,815 A * | 10/1989 | Phillips, II | F16B 19/1054 411/38 |
| 7,393,169 B2 * | 7/2008 | Sussenbach | F16B 37/067 411/38 |
| 9,401,578 B2 * | 7/2016 | Cumant | H01R 43/26 |

FOREIGN PATENT DOCUMENTS

EP 1376766 B 6/2009

OTHER PUBLICATIONS

European Office Action dated Sep. 17, 2020.
European Office Action dated Feb. 24, 2021 cited in corresponding EP Application No. 15306965.3.
International Search Report dated Oct. 20, 2017.

* cited by examiner

*Primary Examiner* — Briggitte R. Hammond
(74) *Attorney, Agent, or Firm* — Michael P. Leary

(57) ABSTRACT

The invention relates to a device for fixing an electrical connection terminal to a support having an opening extending between opposed front and rear faces, the device comprising: a bush for location within the opening of the support and provided with opposed front and rear ends between which extends a through-hole, the bush having a first deformation region configured for lateral expansion; a dowel configured for forced insertion into the through-hole so as to cause deformation of the bush, the dowel being provided with connection means engageable with a connector to facilitate the forced insertion of the dowel into the bush and to facilitate fastening of a terminal to the support; characterised in that the bush includes a second deformation region configured for axial contraction and lateral expansion upon forced insertion of the dowel in the bush.

10 Claims, 6 Drawing Sheets

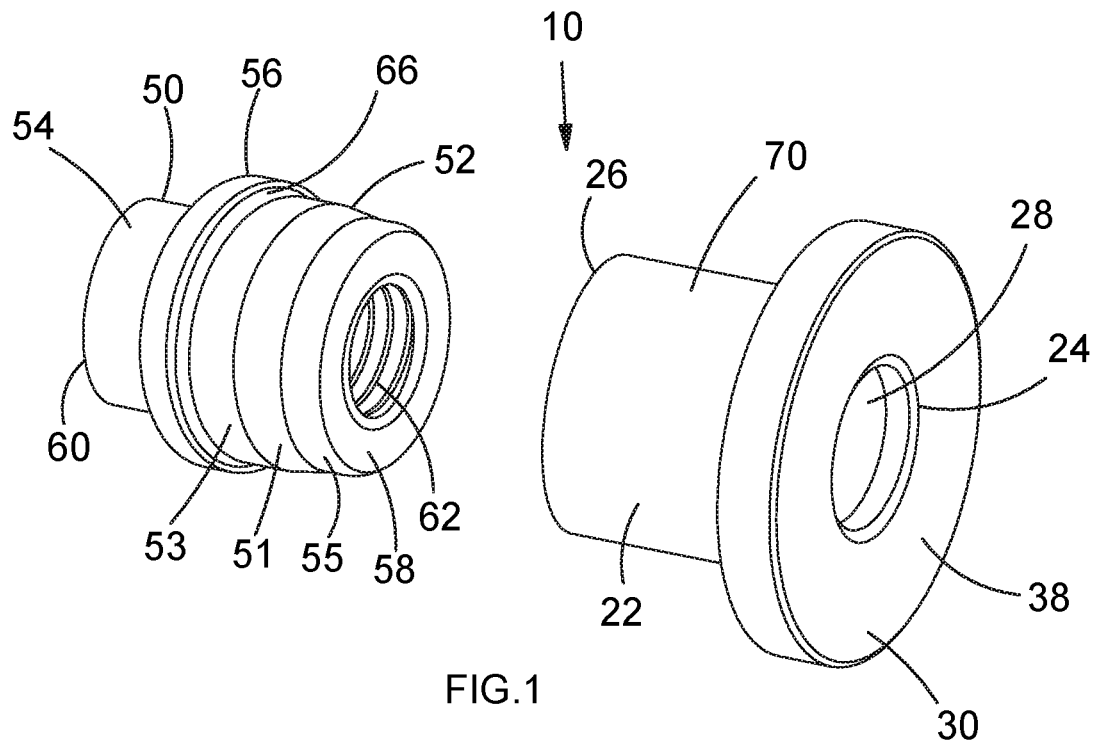
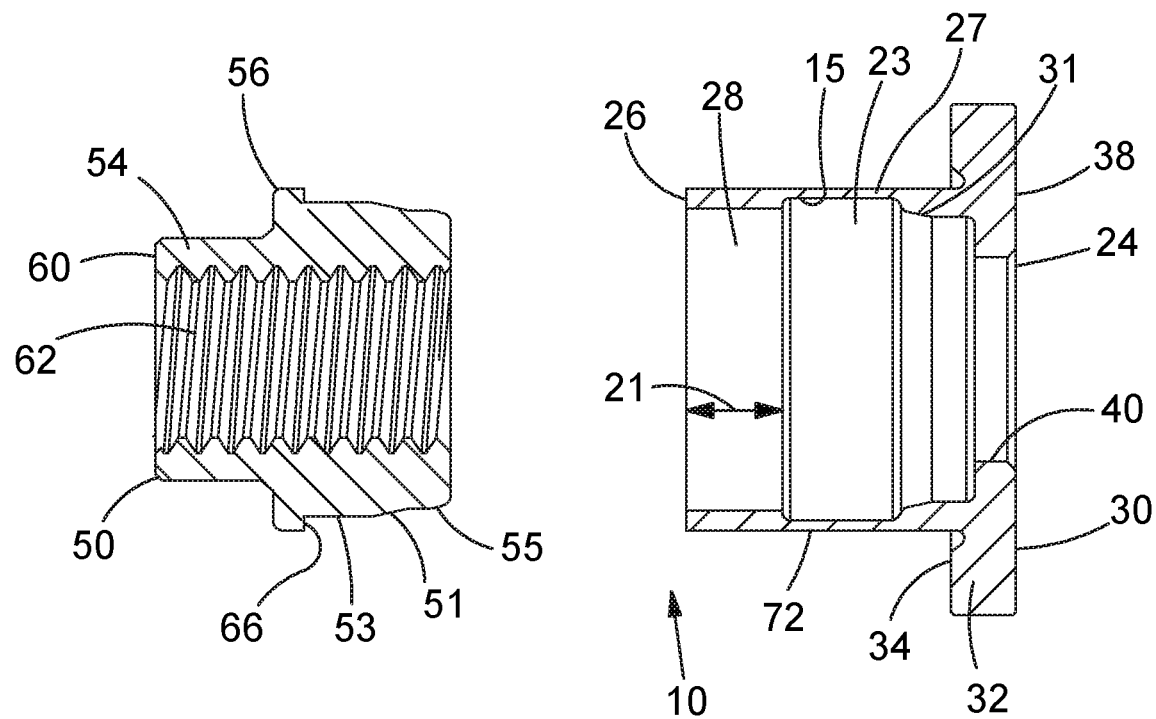
FIG.1
FIG.2

DEVICE FOR FIXING AN ELECTRICAL CONNECTION TERMINAL TO A SUBSTRATE

CROSS-REFERENCE TO RELATED APPLICATION

This application is a continuation of PCT/EP2017/061222, filed May 10, 2017, the disclosure of which is incorporated herein by reference.

BACKGROUND OF THE INVENTION

The invention relates to a device for fixing an electrical connection terminal to a substrate.

Electrical equipment used in many different industries must be earthed, including for example, communications equipment on aircraft or signaling equipment on railways. This typically requires each item of equipment to be electrically connected by means of metal braids or earthing wires to a substrate such as the frame of the aircraft or a rail of railway. The ends of the metal braids or wires are received in terminals which are fixed to the substrate.

Fixing a terminal to a substrate may typically be carried out by means of a screw and a nut, the terminal being held tightly between the head of the screw and a surface of the substrate. In order to ensure good electrical contact between the terminal and the substrate, the surface of the substrate must be stripped of paint or other coating before the assembly of the screw and the nut. Once the assembly has been carried out, the stripped region of the support must be protected against corrosion. For the assembly of the screw and the nut, access is required to the two sides of the substrate during assembly.

EP 1 376 766 in the name of the applicant discloses a device for fixing an electrical connection terminal to a substrate comprising, for example, a railway rail. The device comprises a ring which is to be introduced into a cylindrical hole formed in the substrate, a socket for insertion into the ring and a screw for engagement with a threaded opening provided in the socket. When assembling the device, the ring is first positioned in the cylindrical hole in the substrate, and then a tensile force is exerted on the socket using a tool so as to introduce the socket into the ring with force, thereby causing radial expansion of the ring and locking of the ring in the hole. The screw is then screwed into the threaded opening in the socket, the terminal being held tightly between the head of the screw and the ring, thus making it possible to fix the terminal to the substrate and to establish electrical contact between the terminal and the substrate.

An advantage of this fixing device is that it does not necessarily require the surface of the substrate to be stripped beforehand in order to ensure good electrical contact between the terminal and the substrate. This is because the electrical contact is produced between the ring and the inner surface of the cylindrical hole which is made in the substrate. A further advantage with this fixing device is that it may be assembled without requiring both sides of the substrate to be accessible.

However, the paint or other coating on the surface of the substrate often cracks in the vicinity of the hole during or following the drilling process. These cracks expose the bear surface of the substrate to the elements which eventually cause corrosion in and around the hole. The corrosion can affect the integrity of the electrical and mechanical connection between the substrate and the connecting device. The front end of the ring is furnished with a radially extending flange arranged to bear against the front face of the substrate. If the connecting device is correctly installed, the flange should conceal any cracked paint surrounding the hole as it bears against the front face of the substrate. However, the connecting device is not always installed correctly in that the flange may not be pressed fully against the substrate as the tensile force is applied to the dowel. This leads to the creation of a gap between the flange and the substrate and therefore the cracked paint being exposed to the elements. Even when the connecting device is installed correctly and the cracks on the front face are concealed, this connecting device does not conceal the cracks on the rear face.

It is an object of the present invention to provide a connecting device and method of installation which addresses the shortcomings associated with known connecting devices by providing better protection against corrosion of the substrate.

SUMMARY OF THE INVENTION

According to a first aspect of the invention, there is provided a device for fixing an electrical connection terminal to a support having an opening extending between opposed front and rear faces, the device comprising: a bush for location within the opening of the support and provided with opposed front and rear ends between which extends a through-hole, the bush having a first deformation region configured for lateral expansion; a dowel configured for forced insertion into the through-hole so as to cause deformation of the bush, the dowel being provided with connection means engageable with a connector to facilitate the forced insertion of the dowel into the bush and to facilitate fastening of a terminal to the support; characterised in that the bush includes a second deformation region configured for axial contraction and lateral expansion upon forced insertion of the dowel in the bush.

The forced insertion of the dowel may subject the second deformation region to a compressive force along the axis of the bush. It is this compressive force which causes the contraction and expansion of the second deformation region.

In a preferred embodiment, the second deformation region is configured to form at least one crimp around the bush upon forced insertion of the dowel. It is the geometric and material properties of the second deformation region which lead to the at least one crimp. The compressive force acting across the second deformation region urges the opposed circumferential edges of that second deformation region towards each other and urges an intermediate circumferential band disposed midway between those edges outwardly. Eventually the second deformation region may fold along that intermediate circumferential band and portions of the second deformation region on either side thereof may engage one another to form a closed crimp. The engaged portions of the closed crimp may lie in a plane substantially normal to the axis of the bush. The closed crimp may extend around the bush and bear against a rear face of the substrate immediately surrounding the opening. The closed crimp may therefore conceal any cracks in the paint or coating provided on the rear face of the substrate.

The second deformation region may be configured to form multiple crimps. However, the radial distance by which each crimp extends from the bush may therefore be shorter and consequently each crimp may be less effective in concealing cracked paint on the substrate.

Advantageously, the dowel may include a second abutment configured to engage the rear end of the bush. The inter-engagement of the second abutment and the rear end may serve to transmit an axial force to the bush upon forced insertion of the dowel. The axial force along the bush may result in a compressive force along the second deformation region, particularly if movement of the bush in the direction of the axial force is restricted. The second abutment may be configured to engage the rear end of the bush at a single location, multiple locations or a continuous area.

Furthermore, the dowel may include a first abutment configured to engage and cause deformation of the first deformation region upon forced insertion of the bush into the dowel. In a preferred arrangement, at least one of the first abutment and the first deformation region defines a cammed surface by which axial force of the dowel may be converted to a radial force across the first deformation region. This radial force is advantageous in creating the required lateral expansion. The lateral expansion of the first deformation region may enable the bush to engage firmly with the area of the substrate within the opening so as to produce a good electrical contact.

Preferably the second deformation region of the bush is defined by at least one recess provided on an internal surface of the bush defining the through-hole. As noted above, the geometric and material properties of the second deformation region influences the nature of the crimping and therefore the nature of the at least one recess may be critical.

The second deformation region may comprise one recess or multiple recesses. The width of the recess may determine the radius of the crimp and therefore the size of the area on the substrate covered by the crimp. The depth of the recess may influence the amount of material remaining and therefore the compressive force across the second deformation region necessary to create the crimp.

In a preferred arrangement, the at least one recess comprises an annular groove provided on the internal surface. The annular groove may extend the whole way around the through-hole and may lie in a plane normal to the axis of the through hole.

The annular groove may have various cross-sectional shapes, but the annular groove preferably has a generally u-shaped cross-section defining a base. More preferably the base of the annular groove is substantially flat and the thickness of the portion of the bush at the base is generally uniform. This uniformity is advantageous in creating an effective crimp.

In one arrangement, the annular groove has a width occupying substantially one third of the length of the through hole and in a preferred arrangement the annular groove is arranged approximately midway along the through-hole.

The front end of the bush may include a flange extending outwardly therefrom and having a rear face for engagement with the front face of the support. The inter-engagement between the rear face of the flange and the front face of the support may restrict rearward movement of the bush further into the opening of the support. The flange may also conceal any cracks on the first face of the support immediately around the opening. The first deformation zone may be proximal to the flange and the second deformation zone may be distal to the flange.

There may also be provided a support assembly comprising: a support comprising front and rear faces and an opening extending therebetween; a device as described above, wherein the bush is located in the opening, the dowel is located in the bush, and the first and second deformation regions are deformed to engage the support.

This support assembly is advantageous in that deformation of the first deformation region causes an effective electrical contact between the bush and the portion of the support defining the opening. Furthermore, the deformation of the second deformation region causes effective contact between the bush and the rear face of the support.

According to a further aspect of the invention, there is provided a method of installing a fixing device on a support, the method comprising the steps of: (a) providing a support having front and rear faces and an opening extending therebetween; (b) providing a fixing device comprising: a bush provided with first and second deformation regions, front and rear ends and a through-hole; and a dowel locatable in the through-hole; (c) locating the bush in the opening (d) forcing the dowel into the through-hole so as to cause deformation of the first and second deformation regions.

This method may also include the step of causing lateral expansion of the first deformation region such that it engages a portion of the substrate defining the opening; and causing axial contraction and lateral expansion of the second deformation region such that a crimp is formed against the rear face of the support.

The formation of the crimp has two notable effects. Firstly, the bush is urged further rearwardly such that any flange provided on its front end may bear tightly against the front face of the support so as to conceal cracked paint and to restrict further rearward movement. Secondly the crimp forms tightly against the rear face of the support so as to conceal any cracked paint and to restrict forward movement of the bush.

BRIEF DESCRIPTION OF THE DRAWINGS

By way of example only, one specific embodiment of the present invention will now be described in detail, with reference being made to the accompanying drawings, in which:

FIG. 1 is a front perspective view of the fixing device according to the invention;

FIG. 2 is a cross-sectional view of the fixing device shown in FIG. 1;

DESCRIPTION OF THE PREFERRED EMBODIMENTS

Figure 3:
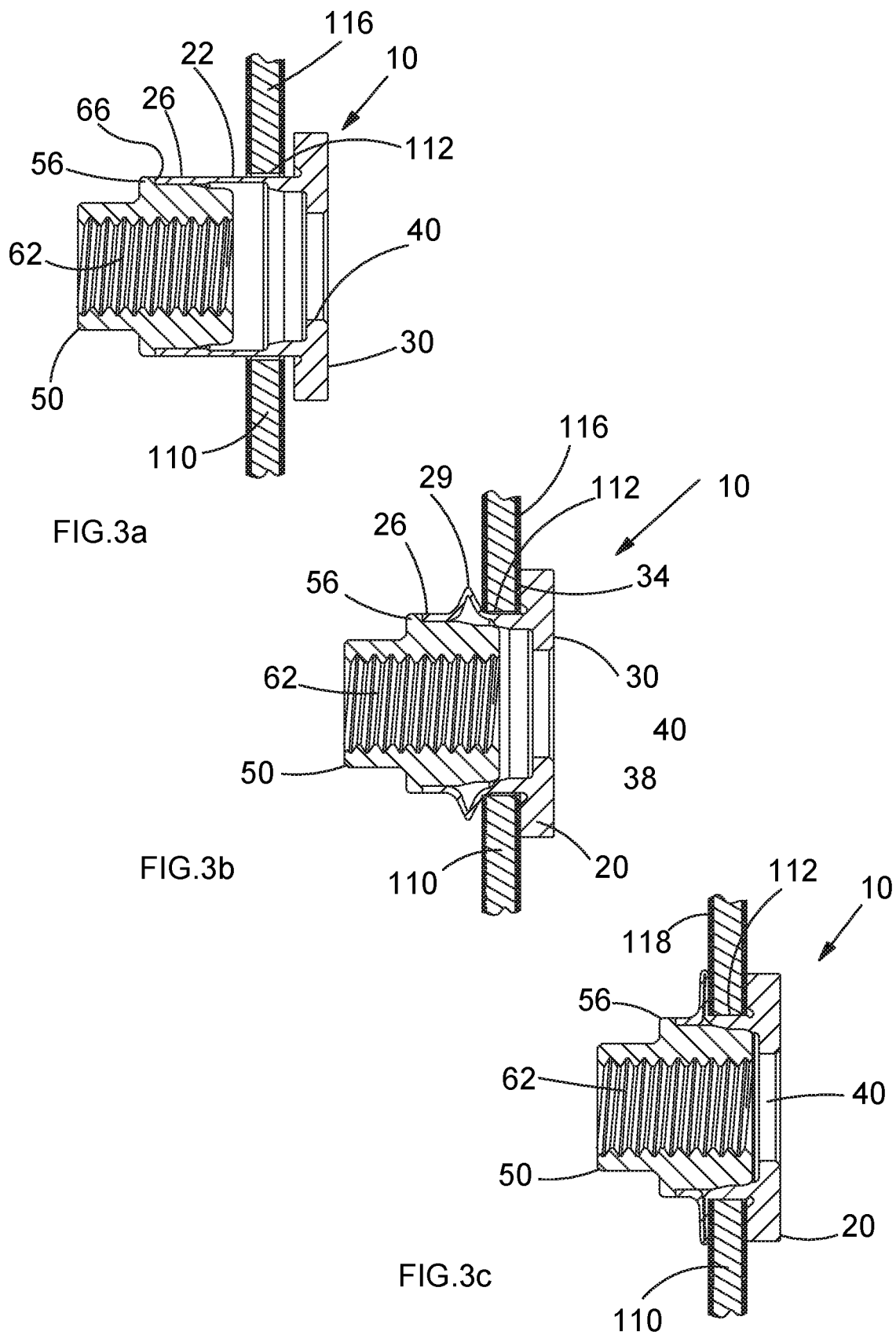
FIGS. 3*a* to 3*c* are cross-sectional views showing three stages of the process of installing into a substrate the fixing device of FIGS. 1 and 2.
Figure 4:
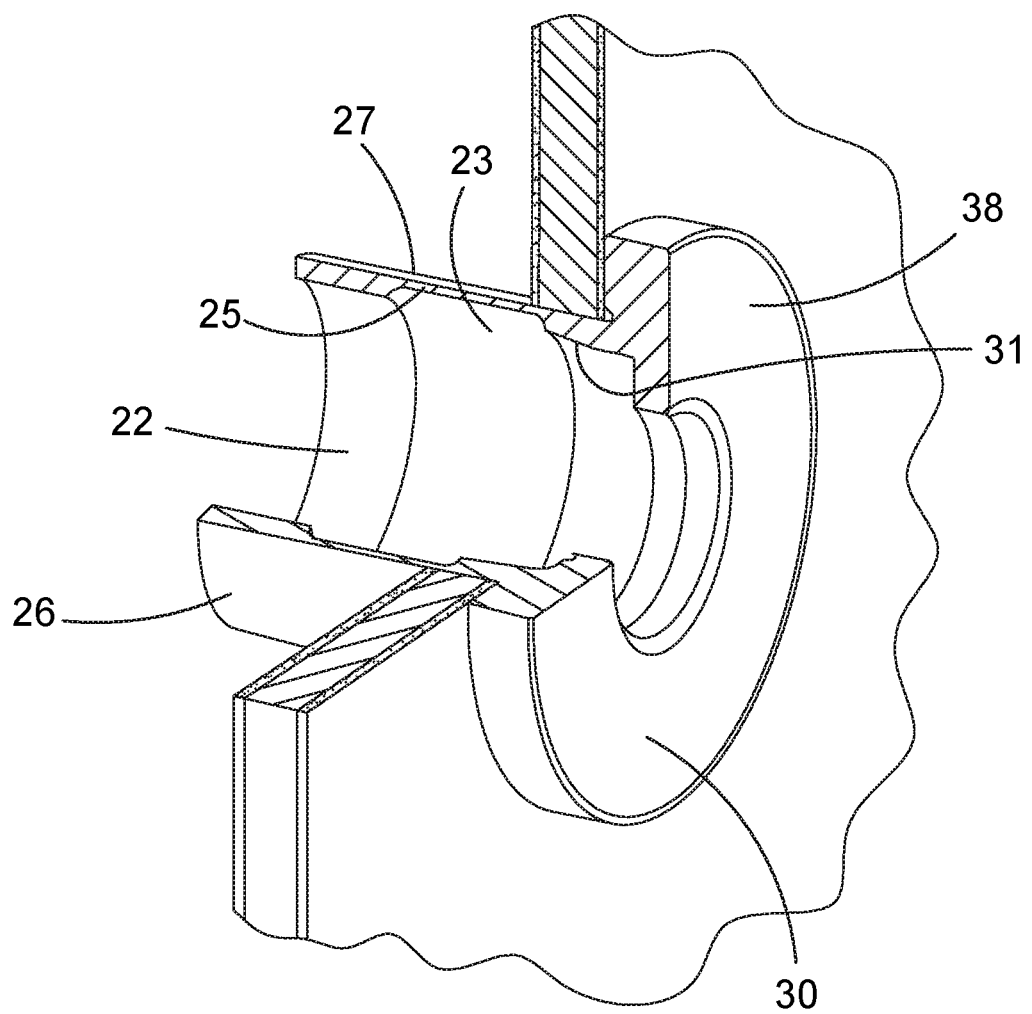
FIG. 4 is a cut-away perspective view of the bush of the fixing device of FIGS. 1 to 3, the bush being mounted in an opening formed in the substrate.

Referring initially to FIGS. 1 and 2, there is provided a fixing device, generally indicated 10, suitable for securing an electrical terminal 100 (FIGS. 6 and 7) to a substrate 110 (FIGS. 6 and 7) provided on an aircraft, a railway line and so on. The fixing device comprises a bush 20 and a dowel 50 locatable within the bush. The bush 20 and the dowel 50 may be cast, machined or cold formed as separate items from aluminum, copper, stainless steel or titanium and finally machine finished to a high standard before possibly being provided with a coating.

The bush 20 has a cylindrical body 22 defining front and rear ends 24, 26 and a bore 28 extending axially therethrough. The cylindrical body 22 is intended for location in an opening 112 in the substrate 110 and is sized to engage closely the portion of the substrate inside the opening 112, such that electrical energy may be conducted between the bush 20 and the substrate 110.

The cylindrical body 22 is provided with an internal surface 21 defining the bore 28. The internal surface 21 is provided with an annular groove 23 located substantially midway along the length of the bore 28. The annular groove 23 may be reasonably wide and shallow and may have a generally U-shaped cross-section so as to define a flat base 25. A portion of the cylindrical body 22 adjacent the flat base 25 defines a second deformation zone 27 of generally uniform and reduced thickness.

The cylindrical body 22 also defines a first deformation zone 31 located between the front end 24 of the cylindrical body 22 and the second deformation zone 27. This first deformation zone 31 is defined by a portion of the cylindrical body 22 which thickens towards the front end 24 so as to cause the bore 28 to taper inwardly towards the front end 24.

The bush 20 also includes a plate 30 provided on the front end 24 of the cylindrical body 22 and is sized to extend radially someway therebeyond. The plate 30 has a generally planar front face 38 to which the terminal 100 can be secured. An aperture 40 is formed in the centre of the plate 30 for allowing the passage of a screw 114, bolt or other mechanical fastener to be discussed below in connection with FIGS. 6 and 7. The plate 30 may include a lip 32 extending rearwardly from its periphery to define a rearward facing annular contact face 34.

The dowel 50 includes a narrowing front portion 52, a generally cylindrical rear portion 54 and a circumferential abutment 56 therebetween. The dowel 50 has a generally circular front face 58 defined by the front portion 52, a generally circular rear face 60 defined by the rear portion 54 and a hole 62 extending between those front and rear faces 58,60. The hole 62 is slightly diametrically smaller than the aperture 40 and is threaded to engage the screw 114.

The front portion 52 comprises a frusto-conical mid-section 51 interfacing a diametrically larger rear section 53 and a diametrically smaller front section 55. The length of the front portion 52 is smaller than the length of the bore 28 and the diameters of the front portion are generally larger than the diameter of the bore 28. The abutment 56 is diametrically larger than the front portion 52 and defines a front face 66 lying in a plane substantially normal to the axis of the bore 28.

Installation of the fixing device 10 is illustrated in FIGS. 3a to 3c, 4 and 5. FIG. 3a shows the fixing device 10 loosely located in the opening 112 formed in the substrate 110. The front portion of the dowel 50 is located inside the bore such that the front face 66 of the abutment 56 lightly engages the rear end 26 of the cylindrical body 22.

Turning now to FIG. 3b, a setting tool (not shown) is employed to secure the fixing device on the substrate 110. The setting tool urges the dowel 50 forward into the bore 28 while restricting forward movement of the bush 20. This forward movement of the dowel 50 results in an axial force being applied to the cylindrical body 22 via the interengaging abutment 56 and rear end 26. The cylindrical body 22 is restrained from forward movement so experiences an axial compressive force along its entire length. This causes the cylindrical body 22 to contract axially and to expand laterally at the second deformation zone 27 due to its reduced thickness along the base of the groove 23. This axial contraction and lateral expansion can be seen in FIG. 3b as a partial crimp 29 adjacent the rear face 118 of the substrate 110. The formation of the crimp 29 pulls the bush 20 further rearwardly into the opening 112 such that the annular contact face 34 of the plate 30 firmly engages the front face 116 of the substrate and thus conceals any cracks in the paint or coating surrounding the opening 112.

Figure 5:
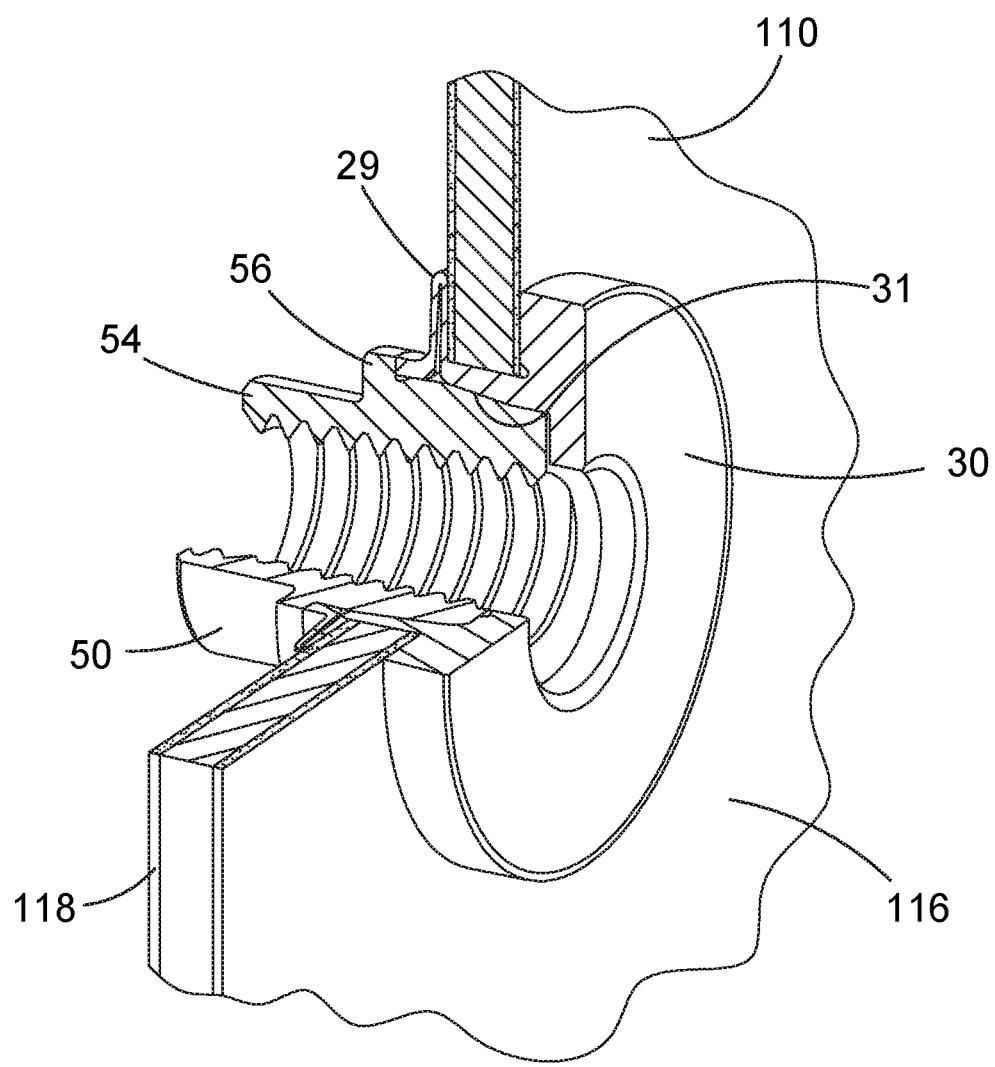
FIG. 5 is a cut-away perspective view of the bush and dowel assembled on the substrate.

FIGS. 3c and 5 show the final step of the installation process in which the dowel 50 has been pulled fully into the bore 28 by the setting tool. This causes continued contraction and expansion of the second deformation zone 27 such that the crimp 29 closes firmly against the second face 118 of the substrate 110. The closed crimp 29 serves to restrain forward movement of the bush 20, but also to conceal any cracks in the paint or coating surrounding the opening 112.

As the dowel 50 is pulled fully into the bore 28, the frusto-conical mid-section 51 of the dowel's front portion 52 acts as another abutment and engages the first deformation zone 31 of the cylindrical body 22. The tapering nature of the frusto-conical mid-section 51 and the first deformation zone 31 converts the axial force into a lateral force resulting in the lateral expansion of the cylindrical body 22. This lateral expansion causes the cylindrical body 22 to engage firmly with the portion of the substrate 110 inside the opening 112, thus defining a third contact area between the connecting device 10 and the substrate 110.

Figure 6:
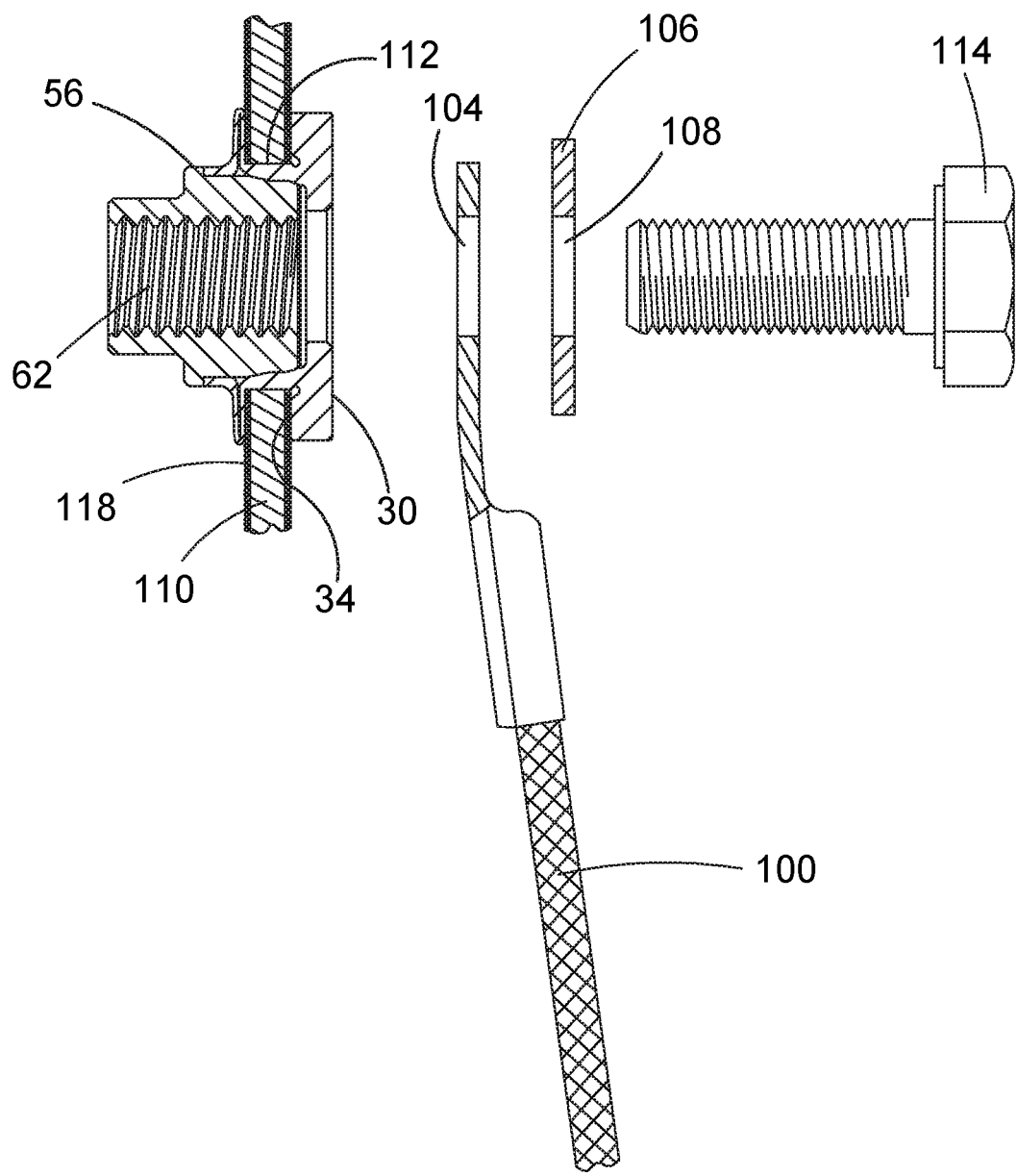
FIG. 6 shows the fixing device fitted to the substrate.

FIG. 6 shows the fixing device 10 secured to the substrate 110, which is trapped tightly between the lip 32 of the plate 30 and the crimp 29 created at the second deformation zone 27 of the cylindrical body 22. In preparation for installation, the terminal 100, the washer 106 and the screw 114 are presented to the fixing device 10. The terminal 100 and the washer 106 each have respective openings 104, 108 corresponding to opening 112 for allowing the passage of the screw 114.

Figure 7:
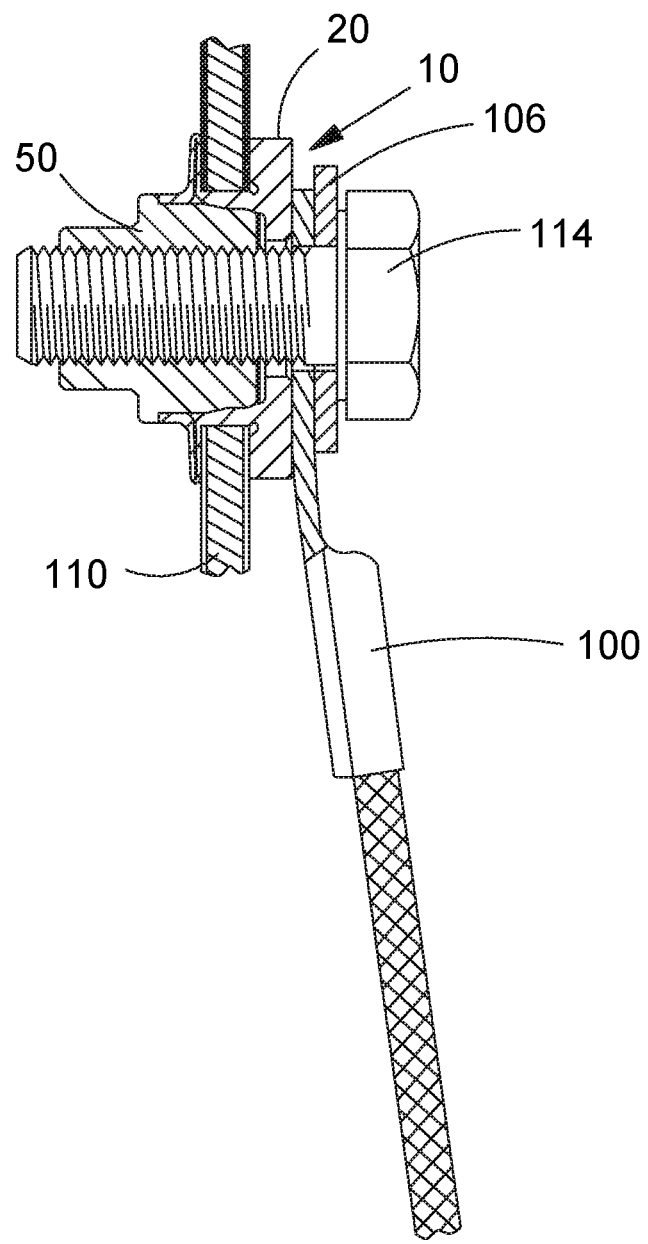
FIG. 7 shows the electrical terminal secured to the fixing device by a screw.

FIG. 7 shows the terminal 100 secured to the substrate 110 via the screw 114, washer 106 and the fixing device 10. The inter-engagement of those parts facilitates effective electrical conductivity between the terminal 100 and the substrate 110.

It will be appreciated by persons skilled in the art that the above embodiments have been described by way of example only, and not in any limitative sense, and that various alterations and modifications are possible without departure from the scope of the invention as defined by the appended claims.

What is claimed is:

1. A device for fixing with a connector an electrical connection terminal to a support having an opening extending between opposed front and rear faces, the device comprising:
   a bush for location within the opening of the support and provided with opposed front and rear ends between which extends a through-hole, the bush having a first deformation region configured for lateral expansion;
   a dowel configured for forced insertion into the through-hole so as to cause deformation of the bush, the dowel being provided with connection means engageable with the connector to facilitate the forced insertion of the dowel into the bush and to facilitate fastening of the terminal to the support; and
   the bush includes a second deformation region configured for axial contraction and lateral expansion upon forced insertion of the dowel in the bush, and the second deformation region is defined by at least one recess provided on an internal surface of the bush defining the through-hole, and the at least one recess comprises an annular groove provided on the internal surface and located substantially midway along the through-hole.

2. The device as claimed in claim 1, wherein the second deformation region is configured to form a crimp upon forced insertion of the dowel.

3. The device as claimed in claim 1, wherein the dowel includes a second abutment configured to engage the rear end of the bush so as to cause deformation of the second deformation region upon forced insertion of the dowel into the bush.

4. The device as claimed in claim 1, wherein the dowel includes a first abutment configured to engage and cause deformation of the first deformation region upon forced insertion of the bush into the dowel.

5. The device as claimed in claim 1, wherein the annular groove has a generally u-shaped cross-section defining a base portion.

6. The device as claimed in claim 5, wherein the annular groove is formed in a portion of the bush having a generally uniform thickness along the base portion.

7. The device as claimed in claim 5, wherein the annular groove has a depth substantially equal to the generally uniform thickness of the bush along the base portion.

8. The device as claimed in claim 1, wherein the annular groove has a width occupying substantially one third of the length of the through hole.

9. The device as claimed in claim 1, wherein the front end of the bush includes a flange extending radially outwardly therefrom and having a rear face for engagement with the front face of the support, the first deformation zone being proximal to the flange and the second deformation zone being distal to the flange.

10. A support assembly comprising:
a support comprising front and rear faces and an opening extending therebetween;
a connector; an electrical connection terminal;
a device comprising:
   a bush for location within the opening of the support and provided with opposed front and rear ends between which extends a through-hole, the bush having a first deformation region configured for lateral expansion;
   a dowel configured for forced insertion into the through-hole so as to cause deformation of the bush, the dowel being provided with connection means engageable with the connector to facilitate the forced insertion of the dowel into the bush and to facilitate fastening of the terminal to the support;
characterized in that the bush includes a second deformation region configured for axial contraction and lateral expansion upon forced insertion of the dowel in the bush, and the second deformation region is defined by at least one recess provided on an internal surface of the bush defining the through-hole, and the at least one recess comprises an annular groove provided on the internal surface and located substantially midway along the through-hole; and
wherein the bush is located in the opening, the dowel is located in the bush, and the first and second deformation regions are deformed to engage the support.

\* \* \* \* \*